(12) United States Patent
Harris

(10) Patent No.: US 6,822,950 B2
(45) Date of Patent: Nov. 23, 2004

(54) INTERFERENCE-EFFICIENT METHOD AND APPARATUS TO PROVIDE CDMA SERVICES

(75) Inventor: John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 161 days.

(21) Appl. No.: 10/139,867

(22) Filed: May 6, 2002

(65) Prior Publication Data

US 2003/0206540 A1 Nov. 6, 2003

(51) Int. Cl.$^7$ .............................................. H04L 4/00
(52) U.S. Cl. ..................... 370/335; 370/342; 370/441; 370/479; 455/522
(58) Field of Search ................................ 370/252, 320, 370/333, 335, 342, 441, 479; 455/522, 63.1, 67.11, 67.13, 135

(56) References Cited

U.S. PATENT DOCUMENTS 4,942,570 A     7/1990   Kotzin et al.
5,987,326 A  * 11/1999   Tiedemann et al. ......... 455/442
6,021,328 A  *  2/2000   Curtis et al. ................ 455/443
6,044,072 A  *  3/2000   Ueda .......................... 370/335
6,181,738 B1 *  1/2001   Chheda et al. .............. 375/224
6,285,886 B1 *  9/2001   Kamel et al. ............... 455/522
6,665,283 B2 * 12/2003   Harris et al. ................ 370/333

* cited by examiner

*Primary Examiner*—Kenneth Vanderpuye
*Assistant Examiner*—Duc Duong
(74) *Attorney, Agent, or Firm*—Jeffrey K. Jacobs

(57) ABSTRACT

To address the need for an interference-efficient method and apparatus to provide CDMA services, embodiments of the present invention adjust the outer loop frame error rate (FER) target on the forward and reverse links (110–113) while providing communication services to remote units (101–102). At times during a service when a link is conveying primarily "empty" eighth rate frames, the FER target for that link is increased. This improves system capacity by effectively reducing the power needed to transmit such frames and thereby reducing the resultant interference.

18 Claims, 2 Drawing Sheets

INTERFERENCE-EFFICIENT METHOD AND APPARATUS TO PROVIDE CDMA SERVICES

FIELD OF THE INVENTION

The present invention relates generally to wireless communication and, in particular, to an interference-efficient method for providing CDMA services.

BACKGROUND OF THE INVENTION

The CDMA 2000 standard provides for two types of channels, a fundamental channel (FCH), which is the only type of channel for providing voice services, and a dedicated control channel (DCCH). For a DCCH, full frames of data must be transmitted. That is, if less than a full frame of bits are to be transmitted, then the frame must filled (padded) with unneeded bits in order to send a full frame. For a DCCH, when there is no data to send, only power control information is sent at approximately 800 bits per second rate.

For a FCH, full, half, eighth (& possibly quarter) rate frames of data may be transmitted. That is, the frame rate is generally the lowest rate frame that is large enough to carry the payload. The rest of the frame is then filled (padded) with unneeded bits in order to send the frame rate selected. For a FCH channel, when there is no data to send, power control information and an eighth rate frame is sent. The transmission of this basically empty frame reduces overall system capacity by increasing the level of RF interference in the system. Thus, reducing the RF impact of these eighth rate frames on the system would recover some lost system capacity. Therefore, a need exists for an interference-efficient method and apparatus to provide CDMA services to remote units.

DETAILED DESCRIPTION OF EMBODIMENTS

To address the need for an interference-efficient method and apparatus to provide CDMA services, embodiments of the present invention adjust the outer loop frame error rate (FER) target on the forward and reverse links while providing communication services to remote units. At times during a service when a link is conveying primarily "empty" eighth rate frames, the FER target for that link is increased. This improves system capacity by effectively reducing the power needed to transmit such frames and thereby reducing the resultant interference.

Figure 1:
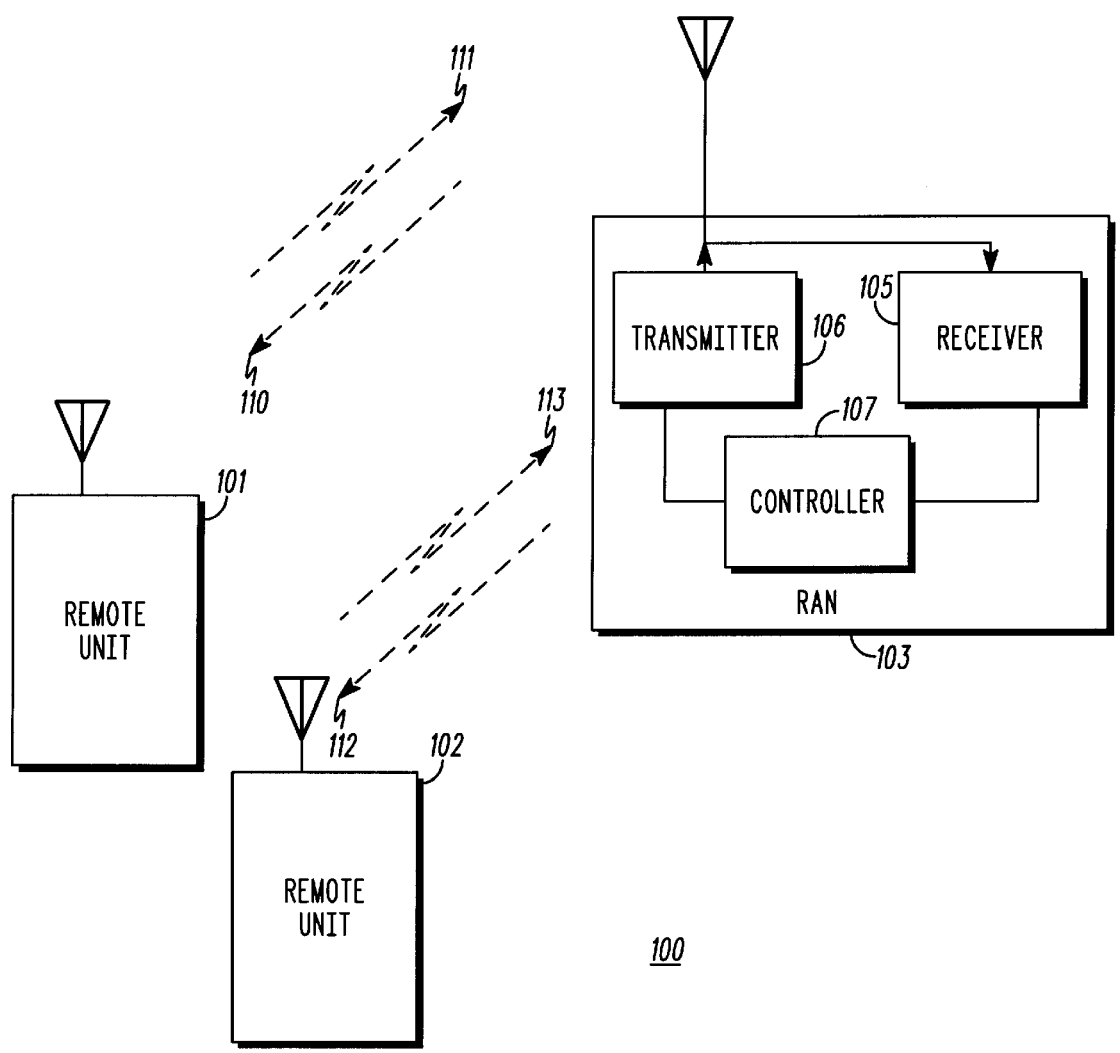
FIG. 1 is a block diagram depiction of a communication system in accordance with an embodiment of the present invention.
Figure 2:
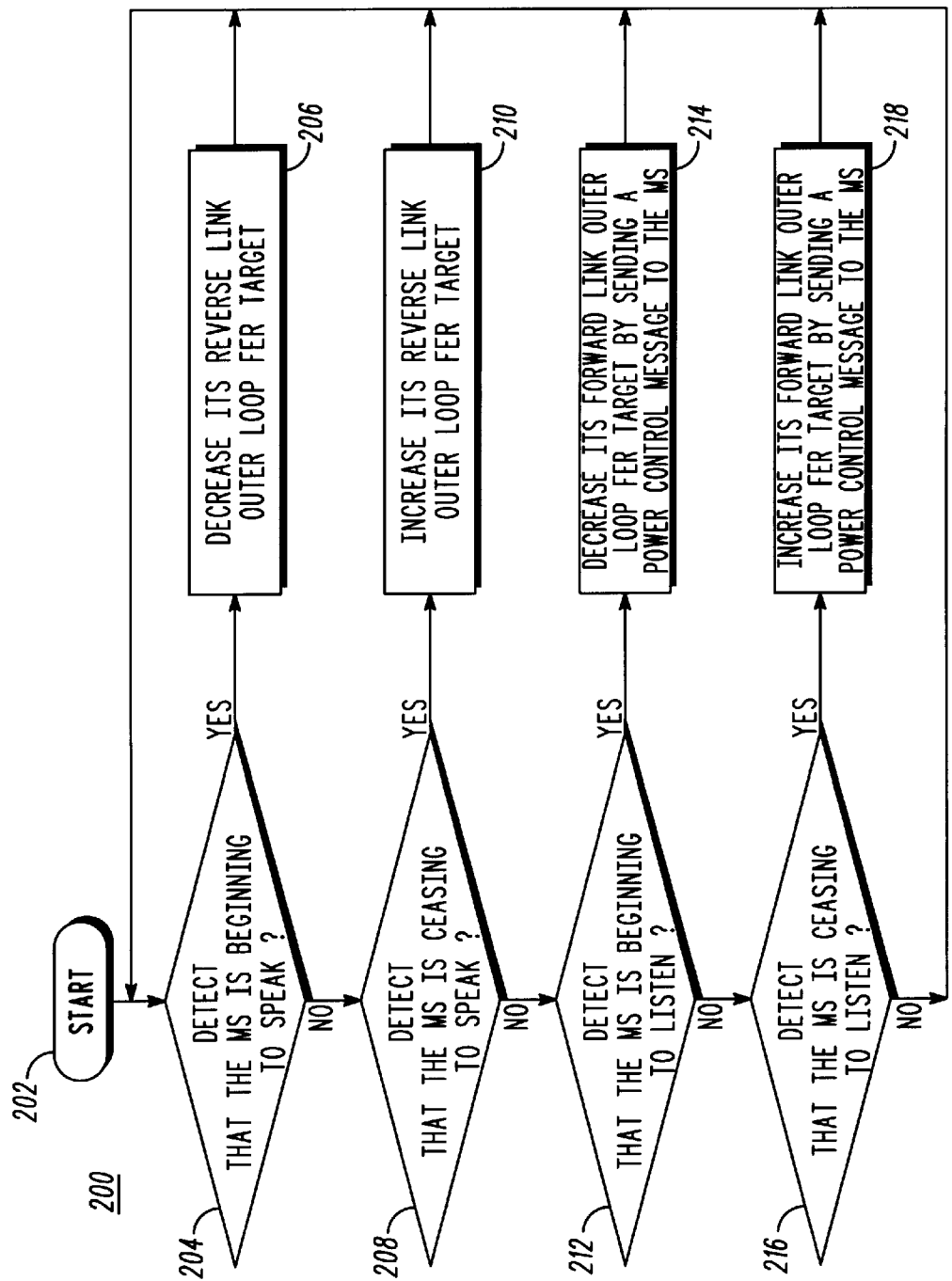
FIG. 2 is a logic flow diagram of steps executed by a radio access network in accordance with an embodiment of the present invention.

The present invention can be more fully understood with reference to FIGS. 1 and 2. FIG. 1 is a block diagram depiction of a communication system 100 in accordance with an embodiment of the present invention. Communication system 100 is a well-known Code Division Multiple Access (CDMA) system, specifically a CDMA 2000 system, which is based on the Telecommunications Industry Association/Electronic Industries Association (TIA/EIA) standard IS-2000, suitably modified to implement the present invention. Alternative embodiments of the present invention may be implemented in communication systems that employ power control across other technologies such as IS-95 or Universal Mobile Telephone Service (UMTS).

The first embodiment of the present invention includes radio access network (RAN) 103 and remote units, such as mobile stations (MSs) 101 and 102. However, the present invention is not limited to remote units that are mobile. For example, a remote unit may comprise a desktop computer wirelessly connected to the radio access network.

Those skilled in the art will recognize that FIG. 1 does not depict all of the network equipment necessary for system 100 to operate but only those system blocks particularly relevant to the description of embodiments of the present invention. For example, RAN 103 comprises well-known entities such as a transmitter 106, receiver 105, and controller 107. Those skilled in the art are aware of the many ways each of these entities can be implemented and/or purchased from wireless communications companies such as "MOTOROLA." Controllers, for example, typically comprise components such as processors, memory, and/or logic circuitry designed to implement algorithms that have been expressed as computer instructions and/or in circuitry. Given an algorithm or a logic flow, those skilled in the art are aware of the many design and development techniques available to implement a controller to perform the logic.

Typically, RAN transmitters and receivers are components of RAN base transceiver stations (BTSs), which interface with devices such as base site controllers, mobile switching centers/virtual location registers (MSC/VLR), home location registers (HLR), etc. In a first embodiment of the present invention, a known CDMA 2000 RAN is adapted using known telecommunications design and development techniques to implement the RAN aspect of the present invention. The result is RAN 103, which performs the method described with respect to FIG. 2. Those skilled in the art will recognize that the RAN aspect of the present invention may be implemented in and across various physical components of RAN 103, including physical components that are not even co-located.

RAN 103 communicates with MS 101 and 102 via CDMA 2000 air interface resources 110–113. Resources 110 and 112 are forward CDMA links established between RAN 103 and MS 101 and 102, respectively. Similarly, resources 111 and 113 are reverse CDMA links established between RAN 103 and MS 101 and 102, respectively.

Operation of multiple embodiments of the present invention occurs substantially as follows. One of the most beneficial applications of the present invention is to dispatch calls where a user is either speaking or listening but not both at the same time. For example, assume MS 101 and MS 102 are involved in a dispatch call via established links 110–113. While MS 101's user is speaking, voice frames are being transmitted via reverse link 111 and forward link 112, but no voice frames are being transmitted to MS 101 via forward link 110 or transmitted to RAN 103 via reverse link 113. However, since links 110–113 comprise fundamental channels (FCHs), links 110 and 113 are being used to transmit eighth rate frames without bearer data.

Moreover, without the present invention these "empty" eighth rate frames are being transmitted at a power level that is required to incur only a 2% frame error rate (FER). This is the same FER that is targeted for the voice frames on links 111 and 112. In a first embodiment of the present invention, RAN 103 targets a first FER level (e.g., 2%) for reverse link 111 through power control signaling while MS 101 is in a speaking mode. Now when MS 101 exits the speaking mode, RAN 103 will target an increased FER level (e.g., 10%) for reverse link 111. Thus, when MS 101 is in a non-speaking mode (i.e., when RAN 103 is receiving FCH eighth rate frames without bearer data from MS 101), RAN 103 reduces MS 101's transmit power level through regular power control signaling (i.e., the punctured power control bits sent down to the MS) to target an increased FER level.

In the first embodiment, RAN 103 will receive an indication when MS 101 is entering or exiting a listening mode. For dispatch communication services, these messages are the dispatch talker arbitration messages that assist the RAN in determining which MS, if any, is speaking. In response to an indication that MS 101 is entering a listening mode, RAN 103 will transmit an indication to MS 101 to target a third FER level (e.g., 2%) for forward link 110 through power control signaling. Since MS 101 is providing the power control feedback for forward link 110, RAN 103's indication comprises a power control message instructing MS 101 to target the third FER level. In IS-2000 (IS-2000 standard section numbers are indicated), this is a Power Control Message (PCMM) which allows one to change the Forward FER target (FPCH_DCCH_FER) in the MS (3-7-3-3-2-25). This message can be sent while in the Traffic Channel Substate (3-6-4-3) or release substate (3-6-4-4).

Similarly, in response to an indication that MS 101 is exiting the listening mode, RAN 103 will transmit an indication to MS 101 to target a fourth FER level (e.g., 10%) for forward link 110 through power control signaling. Similarly again, RAN 103's indication comprises a power control message instructing MS 101 to target the fourth FER level.

Thus, in the first embodiment, the FER level targeted for the forward link of a listening MS is less than the FER level targeted when the MS is not listening. It is when the MS is not listening that "empty" eighth rate frames are being transmitted by the RAN, and it is these frames, therefore, that can be transmitted at a lower power level.

The call pattern for dispatch calls is particularly well suited for application of the present invention. Dispatch call users typically speak for about 5 seconds, have no activity for about 2 seconds, and listen for about 5 seconds, repeating this pattern throughout the dispatch call. Three modes result from this pattern: a dispatch speaking mode, a dispatch listening mode, and a dispatch inactive or passive mode. These modes align very closely with the speaking/non-speaking and listening/non-listening modes described above with respect to the first embodiment of the present invention. However, alternative embodiments of the present invention are envisioned for communication services that have send/receive patterns similar to those of dispatch.

FIG. 2 is a logic flow diagram of steps executed by a radio access network in accordance with an embodiment of the present invention. Logic flow 200 begins (202) when a remote unit enters into a call (e.g., a dispatch call). Throughout this remote unit call or connection, the RAN monitors for a change in the remote unit's mode.

If (204) the RAN detects that the remote unit is beginning to speak, the RAN will decrease (206) its reverse link outer loop FER target. When (208) the RAN detects that the remote unit is ceasing to speak, i.e., exiting the speaking mode, the RAN will increase (210) its reverse link outer loop FER target in order to reduce the power used to send the "empty" eighth rate frames. When (212) the RAN detects that the remote unit is beginning to listen, the RAN sends a power control message to the remote unit instructing the remote unit to decrease (214) its forward link outer loop FER target. When (216) the RAN detects that the remote unit is ceasing to listen, the RAN sends a power control message to the remote unit instructing the remote unit to increase (218) its forward link outer loop FER target. Again, this is to reduce the power used by the RAN to send the "empty" eighth rate frames. Thus, by increasing the FER target when call content is not being sent on a link, the present embodiment increases system capacity by decreasing the RF impact of this type of signaling.

While the present invention has been particularly shown and described with reference to particular embodiments thereof, it will be understood by those skilled in the art that various changes in form and details may be made therein without departing from the spirit and scope of the present invention.

What is claimed is:

1. An interference-efficient method for a radio access network (RAN) to provide communication services to a remote unit in a code division multiple access (CDMA) system, the method comprising:
   establishing a communication channel with the remote unit, wherein the communication channel includes a CDMA forward link and a CDMA reverse link;
   while the remote unit is in a speaking mode, targeting a first frame error rate (FER) level for the reverse link through power control signaling;
   while the remote unit is in a non-speaking mode, targeting a second FER level for the reverse link through power control signaling, wherein the second FER level is greater than the first FER level;
   receiving an indication that the remote unit is entering a listening mode;
   in response to the indication that the remote unit is entering the listening mode, transmitting an indication to the remote unit to target a third FER level for the forward link through power control signaling.

2. The method of claim 1, wherein targeting the second FER level while the remote unit is in a non-speaking mode comprises receiving fundamental channel (FCH) eighth rate frames without bearer data.

3. The method of claim 1, wherein the communication channel comprises a traffic channel.

4. The method of claim 1, further comprising:
   receiving an indication that the remote unit is exiting the listening mode; and
   in response to the indication that the remote unit is exiting the listening mode, transmitting an indication to the remote unit to target a fourth FER level for the forward link through power control signaling, wherein the fourth FER level is greater than the third FER level.

5. The method of claim 4, wherein transmitting the indication to the remote unit to target the third FER level comprises transmitting a power control message instructing the remote unit to target the third FER level and wherein transmitting the indication to the remote unit to target the fourth FER level comprises transmitting a power control message instructing the remote unit to target the fourth FER level.

6. The method of claim 4, wherein the indication that the remote unit is entering a listening mode and the indication that the remote unit is exiting the listening mode are each a dispatch talker arbitration message.

7. The method of claim 4, wherein the first FER level is equal to the third FER level and the second FER level is equal to the fourth FER level.

8. The method of claim 7, wherein the first FER level and the third FER level are equal to a 2% FER, and the second FER level and the fourth FER level are equal to a 10% FER.

9. The method of claim 4, wherein the speaking mode comprises a dispatch speaking mode, the non-speaking mode comprises the listening mode and a passive mode, and the listening mode comprises a dispatch listening mode.

10. A radio access network (RAN comprising:

a transmitter;

a receiver; and a controller, coupled to the transmitter and the receiver, adapted to establish a communication channel with a remote unit using the transmitter and the receiver, wherein the communication channel includes a CDMA forward link and a CDMA reverse link, adapted to target a first frame error rate (FER) level for the reverse link through power control signaling while the remote unit is in a speaking mode, and adapted to target a second FER level for the reverse link through power control signaling while the remote unit is in a non-speaking mode, wherein the second FER level is greater than the first FER level and wherein the controller is further adapted to receive an indication via the receiver that the remote unit is entering a listening mode, and further adapted to instruct the transmitter to transmit an indication to the remote unit to target a third FER level for the forward link through power control signaling in response to the indication that the remote unit is entering the listening mode.

11. The RAN of claim 10, wherein the communication channel comprises a traffic channel.

12. The RAN of claim 10, wherein the controller receives fundamental channel (FCH) eighth rate frames without bearer data via the receiver while targeting the second FER level when the remote unit is in a non-speaking mode.

13. The RAN of claim 10, wherein the controller is further adapted to receive an indication via the receiver that the remote unit is exiting the listening mode, and further adapted to instruct the transmitter to transmit an indication to the remote unit to target a fourth FER level for the forward link through power control signaling in response to the indication that the remote unit is exiting the listening mode, wherein the fourth FER level is greater than the second FER level.

14. The RAN of claim 13, wherein the controller is further adapted to instruct the transmitter to transmit a power control message instructing the remote unit to target the third FER level when transmitting the indication to the remote unit to target the third FER level and wherein the controller is further adapted to instruct the transmitter to transmit a power control message instructing the remote unit to target the fourth FER level when transmitting the indication to the remote unit to target the fourth FER level.

15. The RAN of claim 13, wherein the indication that the remote unit is entering a listening mode and the indication that the remote unit is exiting the listening mode are each a dispatch talker arbitration message.

16. The RAN of claim 13, wherein the first FER level is equal to the third FER level and the second FER level is equal to the fourth FER level.

17. The RAN of claim 16, wherein the first FER level and the third FER level are equal to a 2% FER, and the second FER level and the fourth FER level are equal to a 10% FER.

18. The RAN of claim 13, wherein the speaking mode comprises a dispatch speaking mode, the non-speaking mode comprises the listening mode and a passive mode, and the listening mode comprises a dispatch listening mode.

* * * * *